United States Patent [19]

Kügler

[11] Patent Number: 5,374,139

[45] Date of Patent: Dec. 20, 1994

[54] PROCESS FOR PRODUCING A SEALING FOR WASTE DUMPS AND THE LIKE

[76] Inventor: Jost-Ulrich Kügler, Im Teelbruch 61, 4300 Essen 18, Germany

[21] Appl. No.: 934,323

[22] Filed: Aug. 25, 1992

Related U.S. Application Data

[63] Continuation of Ser. No. 545,076, Jun. 29, 1990, Pat. No. 5,141,362.

[30] Foreign Application Priority Data

Jun. 30, 1989 [EP] European Pat. Off. ........ 89111993.5

[51] Int. Cl.$^5$ ............................ B09B 1/00; E02D 3/00
[52] U.S. Cl. ................................. 405/129; 405/128; 405/263
[58] Field of Search ............... 405/128, 129, 258, 263, 405/264, 270, 271

[56] References Cited

U.S. PATENT DOCUMENTS

| | | | |
|---|---|---|---|
| 3,411,582 | 11/1968 | Dale | 405/263 X |
| 3,614,867 | 10/1971 | Nieman | 405/129 |
| 3,626,699 | 12/1971 | Lees | 405/263 |
| 4,194,855 | 3/1980 | Egger | 405/128 |
| 4,226,557 | 10/1980 | Kayahara | 405/263 X |
| 4,572,705 | 2/1986 | Vignon et al. | 405/258 X |
| 4,609,487 | 9/1986 | Burkhardt et al. | 252/313.5 |
| 4,645,382 | 2/1987 | Burkhardt et al. | 405/264 |
| 4,759,665 | 6/1988 | Burkhardt et al. | 405/264 |
| 4,768,897 | 9/1988 | Nussbaumer et al. | 405/128 |
| 4,815,963 | 3/1989 | Berkhout | 405/129 X |
| 4,842,774 | 6/1989 | Golden | 405/128 X |
| 4,844,840 | 7/1989 | Feizollahi | 405/129 X |
| 4,950,426 | 8/1990 | Markowitz | 405/128 X |

FOREIGN PATENT DOCUMENTS 0274564 7/1988 European Pat. Off. .
89/01547 2/1989 WIPO .

OTHER PUBLICATIONS

DIN 18,122.
DIN 18,196.
"Merkblatt für die Anwendung von Geotextilen im Erdbau", Seitin 1 bis 41 (Instructional Pamphlet for the Use of Geotextiles in Earthwork, pp. 1–41) (1987).
"Müll und Abfall", Band 20, Nr. 7, Juli 1988, Seiten 281–295 (Garbage and Waste, vol. 20, No. 7, Jul. 1988, pp. 288–295).

Primary Examiner—David H. Corbin
Attorney, Agent, or Firm—Banner, Birch, McKie & Beckett

[57] ABSTRACT

A process for constructing a self-sealing layer for landfills and waste dumps that use a base layer, cap layer, or liner to seal the area from water percolation through cracks or holes. A layer of soil is provided having specified characteristics which will become flowable under the effects of water moving through the layer. The soil is moved into the crack or hole by the water and accumulates until the breach is sealed. Geotextiles, otherwise known as textile mats, may be used inside the layer to reinforce the layer and enhance the self sealing effect of the flowable soil layer. Water glass and an appropriate gelling agent may be used in an embedding zone on either side of the mat to enhance the adhesion between the mat and the material in the cap, base, or liner.

10 Claims, 1 Drawing Sheet

PROCESS FOR PRODUCING A SEALING FOR WASTE DUMPS AND THE LIKE

This application is a continuation of application Ser. No. 545,076, now U.S. Pat. No. 5,141,362filed Jun 29, 1990 which is herein incorporated by reference.

BACKGROUND OF THE INVENTION

In the course of general environmental protection, increasingly stringent requirements are being made for the protection of the subsurface and ground water. Capping and lining the landfill with plastic sheets or with mineral earth substances, e.g., loam, clay-containing loam, or clay is known. If plastic sheets are applied to the embankments, they are made rough on both sides by a ribbing. When loam is applied to embankments sealed with plastic sheets, nubs must also be welded beyond the ribbing, to secure the loam against sliding down the foil, depending on the slope of the embankment.

In some circumstances, it is useful to use a combination of a mineral sealing layer and plastic covering sheets. The mineral sealing layer must, however, maintain the highest possible plasticity to avoid or at least minimize the formation of cracks in the mineral layer. Newer studies from dump excavations have shown that mineral sealing layers located under plastic sheets tend to dry out and form cracks. Crack formation is particularly a problem for mineral layers with high clay content.

For subsurfaces that are highly susceptible to settling such as old dumps, considerable improvements must be made on the subsurface to reduce the crack formation in the mineral capping layer that might be caused by uneven settling of the waste dump mass.

Certain methods can be used to reduce the uneven settling rate of shifting subsoils. One method includes intensive depth compression with gravel piles. Another method is high shear-strength support layers arranged under the mineral capping layer to achieve the most uniform settling behavior in the region of application. Despite these measures, settling cracks cannot be completely avoided since the settling and sinking conditions in an old dump mass are independent of the load due to different types of deposits within the dump. Added to the problem of shifting dump masses are volumetric changes due to degradation caused by rotting and the shrinkage caused by drying. The same holds true for settleable subsurfaces when high loads are applied to the capping layer or layers.

For the capping layer to have sufficient protection against percolating surface water and for liners against water from within the waste dump it is required to form the sealing layer with a minimum gradient of 3 to 5% with due consideration for the settling and sinking so that trapped water can readily run off. High rates of settling or widely different rates of uneven settling may require considerably greater gradients than is normally required thereby increasing the cost of applying the appropriate grade to the landfill.

For the surface or covering layers a continuous surface filter such as gravel, coarse sand, or filter mats may be used over the mineral sealing layer to drain the seepage from within the landfill or the surface water from the top soil or cultivable soil applied over any capping layer. If there are long periods of dry weather, the capping layer under the cultivable soil and the surface filter might become so dried out that shrinkage cracks will form. This is particularly a problem for cover layers of clay, loam, or other artificial mixtures, e.g., tailings with additives of flotation foam and bentonite or mineral mixtures with additives of bentonite. The drying effects in combination with uneven settling rates present the possibility of a high rate of crack formation which can lead to complete destruction of seal integrity so that the waste dump is no longer properly functional.

Due in part to heightened environmental awareness and a few isolated instances of problems, regulatory agencies have raised the requirements for cover layers of waste dumps and have made them equivalent to the quality requirements for liner layers. With the conventional mineral capping materials, the more stringent requirements translate into greater layer thicknesses with the correspondingly higher costs.

From earth works and foundation construction it is known to apply geotextile fabrics, i.e., water permeable flow material or fabric under dams on soft soil layers. These geotextile fabrics provide a uniform surface that is interconnected to hinder the partial sinking of the dam banking material into the soft subsurface and prevents localized fractures in the embankments and a great measure of the adverse effects from strongly differentiated settling conditions. Further applications of geotextiles are described in "Merkblatt fur die Anwendung von Geotextilien im Erdbau", 1987 Edition, Forschungsgesellschaft far StraBen- und Verkehrswesen, Arbeitsgruppe Erd- und Grundbau, Alfred-Schutte Allee 10, 5000 Koln 21. The use of geotextiles for separation and protective layers is also known in waste dump construction.

Despite the above described measures, it has still not been possible to produce sealings and in particular cover sealings for waste dumps, so that they remain functional over longer duration despite the more or less unavoidable crack formation.

It would be desirable to have a cap construction and/or a base or liner construction that would maintain a high level of seal integrity despite uneven settling or extended periods of dry weather.

It would be desirable if the cap, base, or liner construction would compensate for the adverse effects on seal integrity caused by the formation of cracks in such layers.

SUMMARY OF THE INVENTION

It is an object of the invention to provide a cap, base, and/or liner construction that ameliorates the adverse affects from cracks that may form in the layer.

According to the object above and others that will become apparent from the description herein, processes according to the invention comprise: applying a layer of a soil which becomes, under the effects of moving water, a flowable soil of class 2(2) or 2(3) according to German norm DIN 18300-2.2 onto the surface of a cap or base layer of a landfill.

In the process of the invention, the flowable soil layer has the ability to become flowable under the effects of moving drainage water which transports material from the flowable soil layer into a crack in the sealing layer until sufficient flowable soil material has moved into the crack to seal the breach. The flowable soil layer thereby acts effects a self-repair of the sealing layer whereby seal integrity is guaranteed over longer duration since the self-repair function can repeat itself until the flowable soil material in a given location is exhausted. By applying a sufficiently thick layer of flowable soil, seal integrity is maintained for much longer periods than would be otherwise possible.

German standard 18 196, those soil types have the following characteristics:

TABLE 1

| Symbol | Soil Type | Fraction with particle size ≦0.06 mm | Fraction with particle size ≦2 mm | Mixture | Dry Strength | Dilatency | Plasicity | Examples |
|---|---|---|---|---|---|---|---|---|
| GŪ | composite | >15–40% | ≦60% | gravel/silt | poorly or gap graded | | | gravelly moraine, gravelly weathered material, hillfoot debris, declassified glacial till |
| GT̄ | composite | >15–40% | ≦60% | gravel/clay | poorly or gap graded | | | gravelly moraine, gravelly weathered material, hillfoot debris, declassified glacial till |
| SŪ | composite | >15–40% | ≦60% | sand/silt | poorly or gap graded | | | riverine loam, sandy loses |
| ST̄ | composite | >15–40% | >60% | sand/clay | poorly or gap graded | | | decalcified glacial till and calcerous till |
| TL | fine | >40% | >60% | $W_L ≦ 35\%$ | med-high | no reaction low | low | calcerous glacial till, bedded clay |
| OU | organogenic soil and soils with organic components | >40% | — | $35\% ≦ W_L ≦ 50\%$ | med | low-med | intermediate | lacustrine lime, kieselguhr, topsoil |
| OT | organogenic soil and soils with organic components | >40% | — | $W_L ≦ 50\%$ | high | no reaction | high | mud, sea marsh clay, tertiary coal, clays |
| OH | organogenic soil and soils with organic components | >40% | — | | Containing plant material, mostly dark color, musty odor, loss on ignition ≦ 20% by weight | | | top soil, flossy soil |
| OK | organogenic soil and soils with organic components | >40% | — | | Containing mineral components, mostly light color, low density and high porosity | | | calcerous sand, tufe sand, bog lime |
| TU (now UM) | fine | >40% | >60% | $35\% ≦ W_L ≦ 50\%$ | low to medium | slow | slow to intermediate | lacustrine clay, basin silt |

*$W_L$ is the water content at liquid limit

DETAILED DESCRIPTION

Figure 1A:
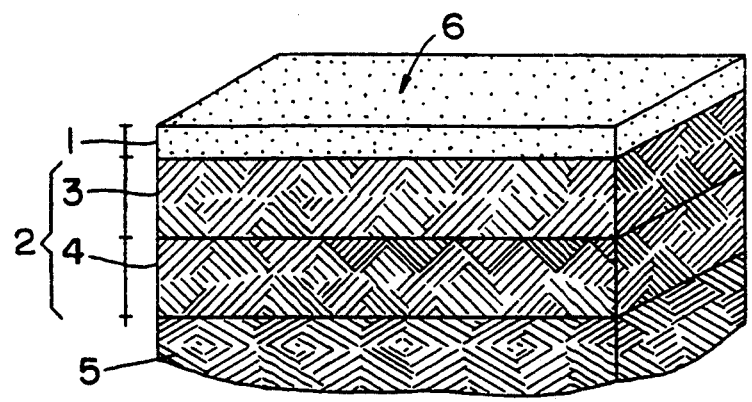
FIGS. 1(a)–(c) are schematic illustrations of various embodiments according to the invention using a layer of soil that becomes flowable under the effects of water moving through the layer.

The flowable soils of the class 2 according to DIN 18300-2.2 incorporate the soil type definitions of German norm DIN 18 196 and define soils of class 2 as: (2) fine grain soils as well as organic soils and soils with organic additives of the groups OU, OT, OH and OK, when they have a pasty or fluid consistency (Ic≦0.5); or (3) mixed grain soils with a portion of grains under 0.063 mm of more than 15 weight-%; these are soils of the group SŪ, ST̄, GŪ and GT̄, when they have a pasty or fluid consistency.

The letter codes relate to the soil groups according to the German norm DIN 18 196. Examples include sewage sludge and sludge from water bodies such as rivers, lakes, seaways, harbors, etc. (hereinafter called water body sludge) under the soil groups OU and OT. Further suitable soils groups are TU and TL. According to Soil of class 2(2) contain more fines compared to the soil types of the class 2(3), which are important for sealing the cracks. On the other hand, the soils of class 2(3) are more easily flowable under the influence of drainage water, which is of great importance for carrying material to seal the cracks, in particular for numerous cracks at one location, also from farther removed locations in the flowable soil layer.

According to the invention, soils of classes 2(2) or 2(3) have both a high content of fines and the ability to flow under the influence of drainage or seepage water. In particular, the flowable soil layer is applied in such a manner that these flow properties become active under the influence of the drainage water moving through the layer of flowable soil, such as precipitation. Preferably, a flowable soil is used with a broad distribution in grain sizes whereby the Atterberg consistency number, Ic, is less than or equal to 0.5.

The coefficient of consistency, $I_c$, depends on the water content, W, of the soil. As the water content decreases, the soild changes from liquid to plastic, semi-solid, and then solid states. The transition points are known as the consistency limits. The liquid limit, $W_L$, is the water content at transition from liquid to plastic states. The plastic limit, $W_P$, is the water content at the transition from plastic to semi-solid states. The coefficient of plasticity, $I_p$, is the difference between the liquid limit and the plastic limit: $I_p = W_L - W_P$. The plastic range between the plastic and liquid limits is further divided into states of pasty, soft, and stiff which are defined in terms of coefficient of consistency, $I_c$.

$$I_c = \frac{W_L - W}{W_L - W_P}$$

Clay soils are not suited for the invention due to the lack of flow properties. On the other hand, clays have very good sealing properties. In a particularly preferred embodiment of the inventive process, a certain portion of clay is added to the flowable soil. Preferably, non-swelling clay minerals are used in an amount generally within the range of 3-10 weight-% With higher clay concentrations, the danger exists that flow properties might be lost As an example, a clay content of 15 weight-% is at the outer edge of acceptability when the clay minerals still have a certain swelling capacity.

A recipe range for the flowable soils used according to the invention can be taken from the following table 2:

TABLE 2

| Component | Weight % | Grain Size, mm |
|---|---|---|
| clay | 5-15 | 0.001-0.002 |
| silt | 35-25 | 0.002-0.063 |
| fine sand | 45-55 | 0.063-0.2 |
| medium and coarse sand | 15-5 | 0.2-1.0 |

For example, naturally occurring loess loam can be used for producing these flowable soils, whose sand content can be determined, by admixing the lacking portions of sand and clay minerals from commercial products. The employed clay for example is ground bricks from house demolition or burnt clay (clay meal) or ground kaolinite or calcium bentonite. Preferably round grains are foreseen for all grain components, in contrast to broken grains.

A further example for the production of a flowable soil suited for the invention consists of sewage sludge or water body sludge, where the lacking sand and clay components can be admixed from commercial produce.

The moisture content is not critical when installing the flowable soil layer in a landfill as a layer in the base seal or as a layer in the cap. However, since the flowable soil layer is usually applied with conventional earth moving machines the water content of the flowable soil is preferably in the dry region of the proctor curve i.e., a water content of 10-20% for the soils of Table 2 and a substantially higher water content when using sludges, for example, up to 50 weight-% or even more. It is possible, however, that a flowable soil layer with substantially higher water contents can be applied by using a finisher as is used in road construction. This manner of application is preferred when the water content of the starting substances is relatively high.

When producing sealed caps for waste dumps, the cap is generally overlaid with a filter layer and cultivable soil. The filter layer lies directly over the flowable soil layer should be a tight filter to ensure that fine particles from the filter layer do not penetrate into the flowable soil layer. This can be achieved by proper graduation of the grain sizes in the filter layer or by inserting a filter flow mat.

The thickness of the flowable soil layer is not subject to any particular limitations. In practice, the minimum thickness is about 3 or 4 cm while the upper limit is determined, among other things, by the amount of flowable soil material which should be available to reseal cracks that might form repeatedly Flowable soil thicknesses of over 15 cm are generally not necessary, while practice suggests thicknesses of 5-10 cm.

Although the above described process delivers satisfactory results for most applications, circumstances may arise where additional materials would be useful to assist in the repair of cracks. One such example is when the number of cracks and/or the crack width is such that the flowable material transported to the cracks passes through the cracks due to the lack of retention capability of the subsurface. In such cases, it has proven advantageous to provide a geotextile or textile mat in or under the sealing layer to reinforce the layer. Preferably, the textile mat is installed in the sealing layer such as in the tension or stress zones. These zones are in the lower one-third of the sealing layer (well position) where frequent settling is to be expected and in the upper one-third of the sealing layer (saddle position) where bulging is possible. The textile mats may be overlapped when necessary.

The permeability of the textile mat is selected so that the grain sizes beyond fine sand and coarser are retained. In this manner, the entire flowable soil material is retained by the textile mat during the self-repair of crack formations. In addition, the sand retained on the mat will act as a sieve to assist in the retention of fine fractions moving through the crack.

Textile mats suitable for the present invention are basically known to those with an ordinary skill level in this art. Mats of fleece material are not desirably used, but instead fabric mats are used to exclude undesired horizontal drainage. Preferably, the mats are the thinnest possible, with low expansion capability and have a high surface roughness with, for example, projecting fabric fibers. These preferred fabrics have a mesh size of $D_w = 0.06-0.2$ mm so that they are capable of retaining a mixture of medium and fine sand, which, in turn, retains silt and clay fractions. The aperture opening is checked in the individual case and matched to the employed flowable soil.

Better adhesion between the textile mat and the sealing sublayers can be obtained by mixing moist clay or moist silt into the mat such as with rolling and compressing. Silt is preferably first worked into the textile mat in moist condition. This takes place by adding water to the region of application and the sublayer and additionally by intensive rolling and compressing. The water content of the cohesive soil to be worked in should lie in the wet region of the proctor density at 93-92%.

It has been found that the advantages of using a textile mat, i.e., the compensation of tensile forces by the textile mat and thus reduction of cracking tendency can not optimally be used in practice. Laboratory studies have shown that the adhesive strength between the textile mat and the sealing layer material is lower than the shearing force in the soil when the textile mat is embedded in wet sealing layer material. To compensate for this imbalance in forces, powdered water glass is applied to a sublayer of the sealing layer to enhance the adhesion between the sealing layer material and the textile mat. The application can take place either by spreading the powdered water glass on the sublayer and working it in by means of a rotary hoe, e.g., to a depth of 5–10 cm, or by premixing the powdered water glass with sealing soil in a forced mixer, and applying the premixture with the desired profile. The powdered water glass is preferably used in an amount of 0.4–2.0 kg/m$^2$. Preferably, sodium water glasses are employed. Suitable commercial products include Portil and Deposit N.

The water necessary for bonding is applied by spraying. When using the premixing technique, the water content in the mixer can be precisely regulated. After laying down the textile mat, it is sprayed with an aqueous solution which contains one or more components of the group of aldehydes, amides, esters and trialkoxysilanes as a gelling agent for water glass (more or less dissolved in the soil water). Water glass/trialkoxysilane system using solutions of water glass are described in the German patent DE-PS 31 51 680 and the German laid-open publication DE-OS 33 13 034. The sealing and injection agent Dynagrout ™ known for sealed wall construction is also suitable for this purpose. Suitable water glass/gelling systems containing aldehydes, amides or esters are described with on page 2 of German patent DE-PS 31 51 680. Preferably, a layer of water glass and gelling agent is applied to either side of the textile mat using substantially the same technique. Sealing soil premixed with powdered water glass is applied to the laid down geotextile mat with a layer thickness corresponding to the lower layer and then sprayed with the gelling agent solution. Care should be taken to ensure admixture of the gelling agent with the upper water glass layer because it is difficult to mix the two together with a rotary hoe without damaging the textile mat.

Due to the possibility of prolonging the potlife with the given gelling agents, one can also mix the gelling agent together with the water glass into the sealing soil.

Just as with the working procedure without a geotextile mat reinforcement, the individual sublayers of the sealing layer are usually compressed or rolled out with conventional earth working machines.

Installing a geotextile mat under the mineral sealing layer does not provide a sufficient barrier. Shifting subsurface levels form horizontally running hollow spaces of large surface area arise which cannot be completely closed in a self-repairing way by sealing soil flowing through the layer and down onto the mat. The space is just too large. Furthermore, a bottom mat does not provide a reduction in the tendency to crack in the mineral sealing layer.

The processing time, i.e., the potlife time before the water glass begins to gel for the can be extended using suitable gel timing agents such as those described in DE-PS 31 51 680 and EP-B 0 141 039 to the time necessary for carrying out the process process Water glass can be used in a powdered form or in a solution. The solution, however, involves additional processing considerations so powdered water glass is preferred. Powdered water glass is applied in a dry form which does not cause wet the surrounding soil so traditional dry soil handling equipment may be used. In addition, powdered water glass has a longer processing time, e.g. from 1–3 days, due to the slow reaction of the powdered water glass with the moisture in the soil so there is plenty of time to form the required structures before gel formation actually takes place in an undisturbed and optimal manner.

It has been found that when using water glass with a gelling agent to increase adhesion, the values for adhesion between the textile mat and sealing layer material could be increased by a factor of 2 to 3, which provides a corresponding improvement in the compensation of tensile stresses. This is, in turn, manifested by a strong reduction in the tendency to crack particularly with respect to both the number and size of cracks. A further advantage of the described adhesion improvement is that the permeability coefficients of the sealing layer, which represents a measure of the quality of the sealing layer, are improved by 33–50%. The invention is conveniently explained with reference to the attached FIG. 1 with embodiments (a)–(c). Where appropriate, the same reference numeral will be used to describe similar structural elements. In FIG. 1(a), flowable soil layer 1 is placed directly over sealing layer 2 divided into upper layer 3 and lower layer 4. Subsurface 5 is thereby sealed from contact with water 6 that could, if allowed to penetrate unchecked, pose the potential that undesired elements from within subsurface 5 would escape and pose an environmental risk.

Figure 1B:
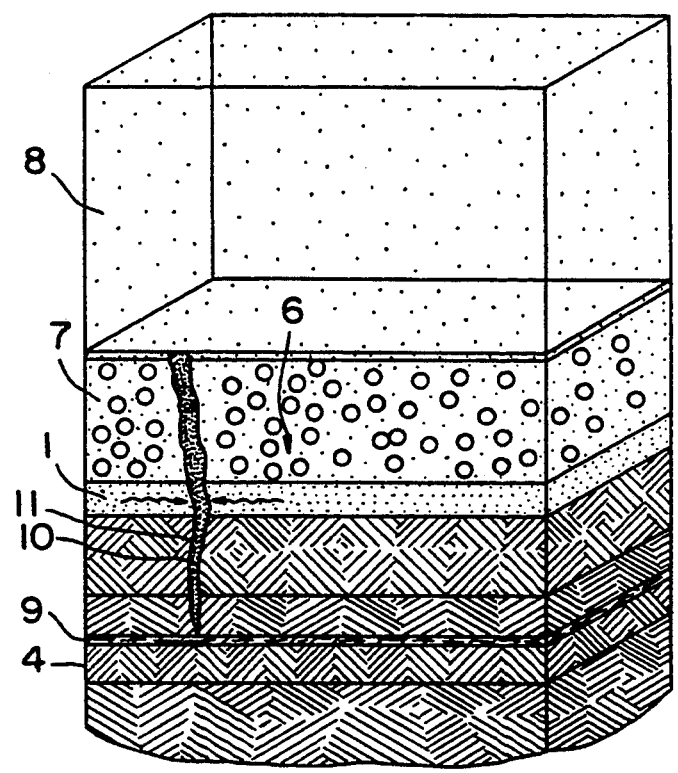

In FIG. 1(b), filter layer 7 is applied directly over flowable soil layer 1 and cultivatable soil layer 8 applied on the top. As illustrated, textile mat 9 is disposed in the lower half of lower layer 4. Crack 10 terminates at textile mat 9 and becomes filled with flowable soil 11 from flowable soil layer 1 as water 6 transports soil 11 to the crack.

Figure 1C:
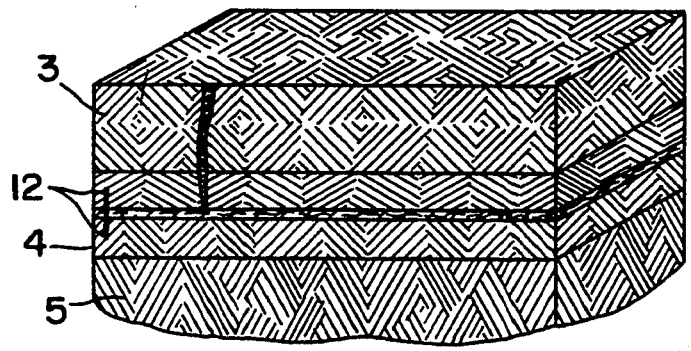

In FIG. 1(c), only sealing layer 2 is shown with textile mat 9 embedded in lower layer 4 using a solution of water glass and a gelling agent in embedding zone 12 on either side of textile mat 9.

In the following, the invention is explained on the basis of experiments.

1. Investigation of the crack behavior of prior art sealing

A pond with a single-layer sealing of loam and bentonite and clay-containing loam and loam with water glass was prepared on a loosely deposited subsurface which was susceptible to settlement. Medium to coarse gravel was applied onto the sealing layer as a protection against drying and against erosion. The pond was located on a flat slope, so that an embankment on the valley side was necessary. The pond maintained its water level (h=1.5 m) for a few weeks. A sharp drop of the water level to about half of the water bead was suddenly observed.

By uncovering the protective layer, it was found that in the embanked dam region of the pond cracks and funnel-like fractures had arisen, through which the water flowed into the underlying mixed-grain soil (bard clay with loam) which allowed drainage. Cracks were found with a width of <1.0 cm. Funnel-shaped wash out formations arose in the area of the fractures. These wash out formations were plugged, the cracks however were left open and again covered with gravel.

The pond was continuously filled to observe, under permanent drainage of the pond water, to what extent a sealing effect would arise by accumulations in the cracks. It was observed that over 4 years, the cracks were not filled in. Moreover, wash out formations arose, through which the water drained off rapidly after several weeks. The cracks were again plugged and water was again filled.

The continuous fluctuations of the water level did not cause the fine cracks or gaps to clog. It is mentioned here that in the area of the cracks, the mineral sealing layer comprising the above mentioned materials had a rigid form even under water and showed no indication of a flow behavior.

After 3 years of investigation, the cracks were deepened by cutting down to the pond base. Over a time period of 1 year, only a water head of about 10 to 20 cm could be observed. After 4 years, it was observed for the first time that the pond had dried down to the base region.

These experiments show that mineral sealings with cracks do not close up in a self-heating manner, even when they are covered with filter layers. Moreover, an enlargement of the cracks occurs from runoff rainwater.

Further, it was found that even when depositing a surface filter of coarse gravel, almost no silt fractions were washed out of the mineral sealing layer by water transport.

2. Crack behavior in a sealing (self-repair) according to the invention

An artificially cracked sealing layer with embedded reinforcement (textile mat) was built into a permeability device, h=15 cm, with a diameter of 10 cm and covered with a filter layer of coarse sand. The permeability value initially was $1 \times 10^{-4}$ m/s. This nearly corresponds to the value of the sand filter. It varied down to the range $1 \times 10^{-5}$ to $1 \times 10^{-6}$ m/s depending on the crack widths, which were 0.5 to 1.2 cm. Despite a continuous water head, blocking the cracks could not be effected.

In further experiments with the same cracked sealing layer, a flowable soil of 10% medium sand, 30–40% fine sand, 30–40% silt and 10–20% non-active clay meal (values in weight-%) was applied 5 cm thick on the sealing layer and lightly covered with filter material (coarse sand). Under a constant head, a value of $<1 \times 10^{-8}$ was measured already after 2 days and after 1 week, a value of $2 \times 10^{-9}$ to $8.5 \times 10^{-10}$ m/s.

The experiments show that by covering cracked sealing layers with flowable types of soil, the cracks are blocked with the flowable soil carried by draining water. The flowable soil is transported into the cracks with the water and depending on the water head can sediment there. The inserted geotextile mat forms a barrier for the flowable soil, which retains medium and fine sand, so that the fines fraction of slit and clay cannot be washed out.

These experiments also show that it is possible to produce mineral sealing layers so that despite their various deformations and the associated crack formations, the sealing erred is retained permanently by closing up the cracks with flowable soil. The reinforcement of the sealing layer enhances the sealing property when major settling and sinking conditions are present, because cracking is greatly reduced. Thus, only a limited and smaller amount of the flowable soil needs to be provided to block the cracks by washing in less amounts. To make the flowable soil available at any arbitrary location, it is covered over the complete surface of the mineral sealing layer although at a reduced thickness. Depending on the danger of crack formation, the sealing layer can be 3-10 cm thick. The reinforcement should lie in the lower or upper $\frac{1}{3}$ of the sealing layer, however always in the stress zones.

3. Tensile stress experiments on geotextiles embedded in cohesive soil (embedding a textile mat in the sealing layer by means of a water glass/gelling agent In this experiment, a textile mat was embedded in wet pasture loam leaving one side open for access to the mat. The textile mat was then drawn out at the untreated side surface. The sealing soil only partially adhered to the geotextile mat. When the textile mat was embedded with water glass and an appropriate gelling agent, a flat soil section was extracted from the sealing layer in all of the stress experiments after a 3–4 day bonding period. This shows that the adhesive forces between the cohesive soil and the geotextile mat are larger than the forces capable of shearing the cohesive soil.

A 20 cm thick sealing layer of pasture loam was applied and compressed on a perforated flexible support. The support plate was mounted on the narrow sides. In this manner, the middle of the sealing layer was raised by 5–12 cm. Depending on the elevation speed, one to three penetrating, wide-open cracks in the seam layer were produced.

For comparison, textile mats were inserted into the sealing layer to determine whether the textile mat would reduce crack formation. Two textile mats were installed into the loam sealing layer in the middle and in the upper third of the layer. Water glass with an appropriate gelling agent were applied in an embedding zone on either side of the mats to a thickness of 3–4 cm. The middle of the reinforced layer was then elevated by 5–12 cm. No cracks were formed which penetrated through the entire layer. A number of smaller crack formations occurred on the surface of the sealing, which however did not penetrate down to the reinforcement.

Based on the high shear resistant bond between the geotextile mat and the cohesive soil achieved with the water glass/gelling agent in the embedding zone, the tensile forces within the sealing layer are uniformly distributed over the entire surface. This distribution of forces is also responsible for the reduction and distribution of the cracks.

I claim:

1. A process for sealing a waste dump exhibiting a clay-containing sealing layer for a waste subsurface to be sealed in said waste dump, said process comprising:
   reinforcing said sealing layer by installing a geotextile fabric mat that exhibits a low expansion capability, a high surface roughness, and projecting fabric fibers in an embedding zone within said sealing layer, wherein the adhesion between clay-containing soil of said embedding zone and said mat is enhanced with water glass and a gelling agent for said water glass.

2. In a process according to claim 1 wherein the improvement further comprises:
   reinforcing said sealing layer by installing a geotextile mat having a fabric mesh size of 0.06 to 0.2 mm within said sealing layer.

3. In a process according to claim 2 wherein the reinforcing step further comprises:
   mixing powdered water glass with said sealing material in a sublayer of said sealing layer before said geotextile mat is installed in said sealing layer,
   laying down said geotextile mat on the sublayer containing said water glass, spraying said geotextile mat with a gelling agent for said water glass, and laying additional sealing soil on top of said geotextile mat.

4. In the process of claim 3, wherein the mixing step comprises mixing water glass with said sealing material below said geotextile mat to a thickness of 5 to 10 cm and laying clay-containing sealing material containing water glass on top of said geotextile mat to a thickness of 5 to 10 cm.

5. In the process of claim 3 wherein the spraying step further comprises:

selecting a gelling agent from the group consisting of aldehydes, amides, esters, or trialkoxysilanes and spraying said geotextile mat with said gelling agent.

6. In a process according to claim 1 wherein the reinforcing step further comprises:

reinforcing said sealing layer by installing said geotextile mat in at least one of the lower one third or the upper one third of the thickness of the sealing layer.

7. In the process of claim 6, wherein the installing step comprises:

installing the geotextile mat in each of the upper third and lower third of the thickness of the sealing layer.

8. In the process of claim 6 wherein the reinforcing step comprises:

selecting the gelling agent from the group consisting of aldehydes, amides, esters, or trialkoxysilanes and spraying said mat with said gelling agent.

9. In the process of claim 6 wherein the reinforcing step comprises:

installing said geotextile mat in said embedding zone with a thickness of 5 to 10 cm on each side of the geotextile mat.

10. In the process of claim 1 wherein the reinforcing step comprises:

installing said geotextile mat into said sealing layer by mixing moist sealing layer soil containing water glass into said mat.

* * * * *